United States Patent [19]
Usami et al.

[11] Patent Number: 5,313,452
[45] Date of Patent: May 17, 1994

[54] OPTICAL RECORDING DISK

[75] Inventors: Mamoru Usami; Toshiki Aoi, both of Saku, Japan

[73] Assignee: TDK Corporation, Tokyo, Japan

[21] Appl. No.: 888,815

[22] Filed: May 27, 1992

[30] Foreign Application Priority Data

May 30, 1991 [JP] Japan .................. 3-155876

[51] Int. Cl.⁵ .................. G11B 7/09; G11B 7/26
[52] U.S. Cl. .................. 369/275.1; 369/283; 369/291; 369/275.4; 430/945; 430/935; 430/270
[58] Field of Search .......... 369/275.1, 288, 283, 369/291, 286, 110, 275.4, 100, 47, 54; 430/945, 935, 964, 270, 271

[56] References Cited

U.S. PATENT DOCUMENTS

| | | | |
|---|---|---|---|
| 4,600,625 | 7/1986 | Abe et al. | 430/945 |
| 4,626,496 | 12/1986 | Sato | 430/945 |
| 4,652,514 | 3/1987 | Abe | 430/945 |
| 4,991,163 | 2/1991 | Tokushuku et al. | 369/275.4 |
| 5,058,096 | 10/1991 | Ando et al. | 369/100 |
| 5,080,946 | 1/1992 | Takagisi et al. | 369/288 |
| 5,099,469 | 3/1992 | Dobbin et al. | 369/286 |
| 5,111,442 | 5/1992 | Nakajima et al. | 369/47 |
| 5,161,150 | 11/1992 | Namba et al. | 369/275.4 |
| 5,219,707 | 6/1993 | Namba | 430/945 |

OTHER PUBLICATIONS

Nikkei Electronics; Jan. 23, 1989; No. 465, p. 107.
SPIE; vol. 1078; Optical Recording Topical Meeting; 1989; pp. 80–87.
The Fuctional Dye Department or the Kinki Chemical Society; Mar. 3, 1989; pp. 14–19.

Primary Examiner—Paul M. Dzierzynski
Assistant Examiner—Kim-Kwok Chu
Attorney, Agent, or Firm—Watson, Cole, Grindle & Watson

[57] ABSTRACT

In preparing an optical recording disk by spin coating a dye-containing solution to an annular substrate to form a recording layer thereon, a circular channel is preformed in the substrate in proximity to the inner peripheral edge of the substrate for defining an inner boundary of the recording layer. Then the recording layer is free of corrugations near its inner boundary, leading to improved adhesion of an overlying protective film and a minimal variation in reflectivity.

5 Claims, 2 Drawing Sheets

OPTICAL RECORDING DISK

This invention relates to an optical recording disk having a dye base recording layer of the coating type.

BACKGROUND OF THE INVENTION

Optical recording disks of the write-once, rewritable and other types have been of great interest as high capacity information bearing media. Optical recording disks include those having a recording layer predominantly comprising a dye. From a structural aspect, there are commonly used disks of the air-sandwich structure having an air space on a dye layer as well as disks of the close contact type having a reflective layer in close contact with a dye layer which can be reproduced in accordance with the compact disk (CD) standard. See Nikkei Electronics, Jan. 23, 1989, No. 465, page 107; the Functional Dye Department of the Kinki Chemical Society, Mar. 3, 1989, Osaka Science & Technology Center; and Proceedings SPIE. The International Society for Optical Engineering, Vol. 1078, pages 80–87, "Optical Data Storage Topical Meeting", 17–19, January 1989, Los Angels.

Such a dye layer is generally formed by spin coating, that is, spreading a coating solution containing a dye on a rotating substrate. The thus applied dye coating extends radially inwardly beyond a predetermined inner boundary because of flow of the coating solution and define a corrugated inner boundary rather than a precise circular inner boundary. Corrugations in the order of a few millimeters are formed near its inner boundary. These corrugations not only deteriorate the appearance of the dye coating, but also cause a variation in the coating area and a variation in coating thickness near the inner boundary. The variation in coating thickness can cause a variation in reflectivity near the inner boundary, for example, of a flat mirror region. In most cases, a reflective layer and a protective film overlie the dye coating. The reflective layer is formed over a precisely defined region by evaporation or similar technique. As a result, the dye coating extends radially inward beyond the reflective layer and sometimes, beyond the overlying protective film too. The random inward extension of the dye coating results in reduced adhesion of the protective film to the substrate and can cause a variation in reflectivity. There is a possibility that the dye coating be dissolved again upon application of the protective film, leading to contamination of the protective film and the coating apparatus. This problem is aggravated when it is desired to form a dye coating of 2,000 Å or thicker.

SUMMARY OF THE INVENTION

Therefore, an object of the present invention is to provide an optical recording disk in which the recording layer can be formed within a precisely defined region on the substrate, and which ensures adhesion of an overlying protective film and experiences a minimal variation in reflectivity.

According to the present invention, there is provided an optical recording disk comprising an annular substrate and a recording layer thereon. The substrate has an inner peripheral edge and an outer peripheral edge. The recording layer is formed by spin coating a coating composition containing a dye to the substrate while rotating the substrate. A generally circular channel is preformed in the substrate in proximity to the inner peripheral edge so that the channel may define an inner boundary of the recording layer during spin coating.

In one preferred embodiment, the disk further includes a reflective layer on the recording layer and a protective film thereon.

Preferably, the substrate has a groove, typically a spiral groove within a region where the recording layer is formed. The recording layer has a thickness of at least 2,000 Å in the groove. The substrate includes a flat region disposed radially inward of the grooved region and the channel is disposed radially inward of the flat region. Preferably, the channel is formed as a plurality of concentric circular channels or a spiral channel.

According to the present invention, the substrate is provided with a channel for defining the inner boundary of the recording layer-forming region. Preferably, a plurality of concentric channels or a spiral channel is preformed in the substrate in proximity to its inner peripheral edge. In spin coating the coating solution containing a dye, a certain amount of the coating solution can be retained within the channel by virtue of surface tension. Differently stated, the channel prevents the coating solution from flowing radially inward beyond the channel.

DETAILED DESCRIPTION OF THE INVENTION

The optical recording disk according to one embodiment of the invention includes a recording layer on an annular substrate. The recording layer is formed by spreading a coating composition containing a light absorbing dye on the substrate while rotating the substrate.

Figure 1:
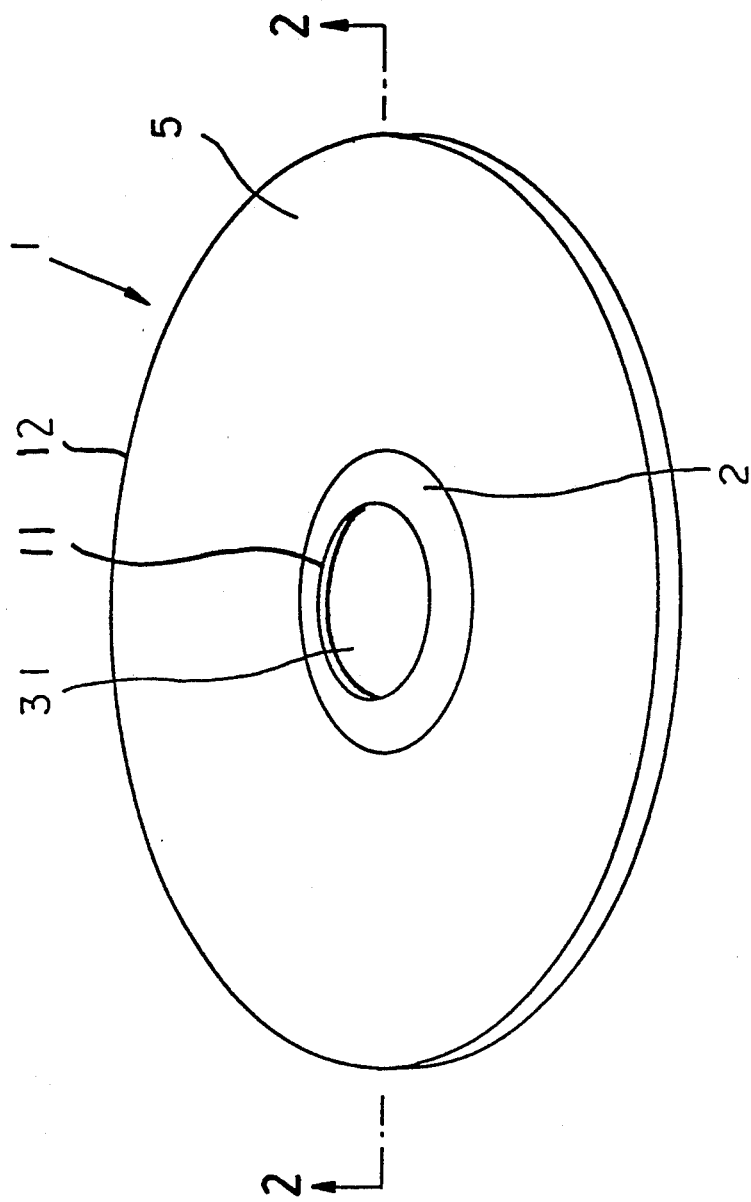
FIG. 1 is a perspective view of an optical recording disk according to one embodiment of the invention.
Figure 2:
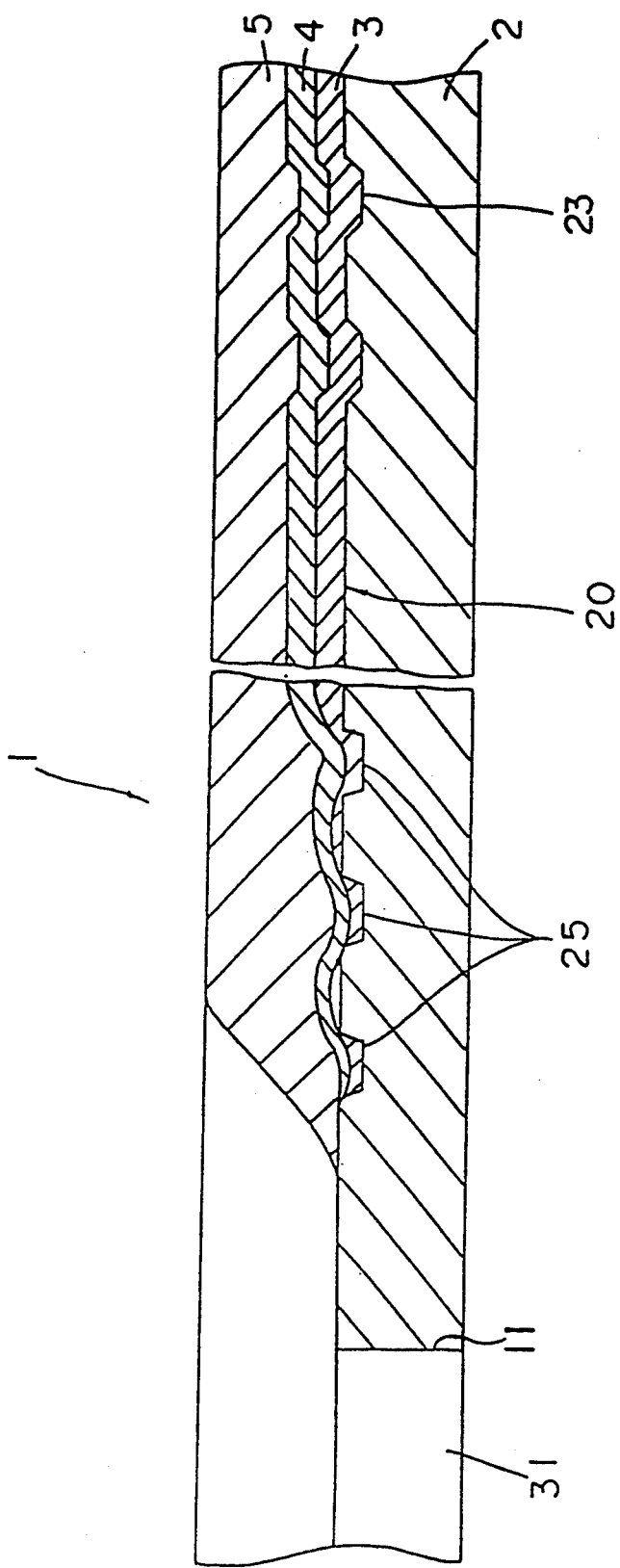
FIG. 2 is a fragmentary, enlarged, cross-sectional view of the disk taken along lines 2—2 in FIG. 1.

One exemplary optical disk is shown in FIGS. 1 and 2. FIG. 1 is a perspective view of the disk and FIG. 2 is a close-up view of an inner edge adjacent portion of the disk taken along lines 2—2 in FIG. 1. The optical recording disk 1 is a close contact type optical recording disk having a reflective layer formed on a recording layer in close relationship meeting the CD standard.

The optical recording disk 1 includes an annular substrate 2 having an inner peripheral edge 11 defining a center hole 31 and an outer peripheral edge 12 and a pair of major surfaces therebetween. The disk 1 further includes a dye-containing recording layer 3 on one major surface of the substrate 2, a reflective layer 4 and a protective layer 5 closely deposited on the recording layer 3.

The substrate 2 is of conventional disk shape as shown in FIG. 1 and has commonly used dimensions, for example, a thickness of about 1.2 mm and an outer diameter of about 64 to 120 mm. The substrate 2 may be formed of a resin or glass material which is substantially transparent to recording and reproducing light, typically a semiconductor laser beam having a wavelength of 600 to 900 nm, especially 770 to 900 nm, most often 780 nm. The substrate material preferably has a transmittance of at least 88% so that recording and reproducing operation can be made through the U substrate 2, that is, from the back surface of the substrate 2 remote from the recording layer 3.

On the surface of the substrate 2 where the recording layer 3 is formed, that is the upper surface in the illustrated embodiment, a groove 23 is formed for tracking purposes as seen from FIG. 2. The tracking groove 23 preferably consists of continuous spiral turns. Typically, the groove 23 has a depth of 0.1 to 0.25 µm and a width of 0.35 to 0.50 µm (width in a radial direction with respect to the disk center). The adjoining turns 23 are separated by a land at a pitch of 1.5 to 1.7 µm. With this groove configuration, tracking signals can be obtained without reducing the reflection level in the groove. It is advantageous to limit the groove width to the range of from 0.35 to 0.50 µm because with a groove width of less than 0.35 µm, tracking signals of less intensity would be obtained and a slight tracking offset induced during recording would result in a larger magnitude of jitter. A width in excess of 0.50 µm tends to cause distortion of reproduced signal waveform, resulting in an increase in crosstalk.

Preferably, the substrate 2 is formed of resins, typically thermoplastic resins such as polycarbonate resin, acrylic resins, amorphous polyolefins, and TPX. Any desired well-known molding technique such as injection molding may be used. Then the groove 23 can be formed at the same time as the substrate 2 is molded from such a resin. Alternatively, a resin layer (not shown) having a predetermined pattern of tracking grooves may be formed on the flat substrate by 2P method or the like.

The substrate 2 includes a flat region 20 disposed radially inward of the grooved region as shown in FIG. 2. The flat region 20 functions as a mirror region.

The substrate 2 further includes a channel 25 disposed adjacent the inner peripheral edge 11 for defining the region over which the recording layer 3 is formed. More particularly, the channel 25 is located between the inner peripheral edge 11 and the grooved region and in the illustrated embodiment, between the inner peripheral edge 11 and the flat region 20. The channel 25 is a continuous circular channel in the substrate 2 where the recording layer 3 terminates in a radially inward direction (or the inner periphery of the recording layer is delimited). Preferably a plurality of concentric channels 25 are coaxially provided (three channels shown in FIG. 2). The channel 25 has a depth of 500 to 3,000 Å, preferably 1,000 to 2,500 Å and a width of 0.3 to 1.2 µm, preferably 0.35 to 0.6 82 m. Preferably the channel 25 has the same depth and width as the groove 23 because cutting or formation of such a channel is facilitated. A plurality of channels 25 are spaced a pitch of 1.5 to 1.7 µm as the groove turns 23 are. The plurality of channels 25 may be located within an annular band of about 1 mm wide in a radial direction. The channels 25 are not limited to a plurality of concentric channels, but a spiral channel 25 including several turns is also acceptable. Like the groove 23, the channel 25 is preferably formed at the same time as injection molding of the substrate 2 although the molded substrate may be subsequently provided with a resin layer having a channel by 2P method. It is to be understood that the channel 25 is discontinuous to the groove 23.

The recording layer 3 is formed on the substrate by spin coating a coating solution containing a dye. The spin coating technique involves spreading the coating solution on the substrate while the substrate is rotating. Spin coating conditions are described in more detail. The revolution of the substrate varies with the desired thickness of the recording layer and the concentration of the coating solution used although the substrate is generally rotated at about 500 to 4,000 rpm. The path of movement of a nozzle for injecting the coating solution is not particularly limited. Often the nozzle is moved from an approximate mid point between the inner and outer peripheral edges 11 and 12 of the substrate to the inner peripheral edge 11, once interrupted at the channel 25 or in proximity to the inner peripheral edge 11, and again moved therefrom toward the starting position while continuously injecting the coating solution through the nozzle. This movement of the nozzle ensures formation of a dye coating whose thickness is uniform from the inner boundary to the outer boundary.

The light absorbing dyes used herein preferably have maximum absorption at a wavelength in the range of from 600 to 900 nm, more preferably from 600 to 800 nm, most preferably from 650 to 750 nm. Such a light absorbing dye is preferably selected from cyanine dyes, phthalocyanine dyes, naphthalocyanine dyes, anthraquinone dyes, azo dyes, triphenylmethane dyes, pyrylium dyes, thiapyrylium dyes, squalirium dyes, chroconium dyes, and metal complex dyes alone or in admixture of two or more. Preferred are the cyanine dyes, typically cyanine dyes having an indolenine ring, especially a benzoindolenine ring.

In the practice of the invention, the recording layer 3 is formed by coating a solution of the dye in a suitable solvent. The solvents include alcohol, ketone, ester, ether, aromatic, and halogenated alkyl solvents. A suitable solvent may be chosen from these solvents in accordance with a particular dye used. The solution usually contains about 2 to 8% by weight of the dye and has a viscosity of about 2 to 10 centipoise. Where a mixture of dyes is used, the solution contains the dye mixture in the above-defined concentration calculated as the dyes combined. Where the dye is used in admixture with a quencher or a bonded combination of dye and quencher is used as will be described layer, the solution contains the dye-quencher mixture or combination in the above-defined concentration calculated as the dye isolated.

The recording layer 3 preferably has a thickness of about 500 to 3,000 Å in dry film form. Outside this thickness range, the reflectance would become too low to reproduce in accordance with the CD standard. Further, the recording layer 3 should preferably have a thickness of at least 2,000 Å, especially 2,000 to 3,000 Å in the recording tracks in the grooves 23 because a greater degree of modulation is obtained. The present invention allows the inner boundary of such a relatively thick recording layer to be defined as a corrugation-free smooth circle.

When CD signals are to be recorded, the recording layer should preferably have a coefficient of extinction (the imaginary part of a complex index of refraction) k of 0.02 to 0.05 at the wavelength of recording and reproducing light. With a coefficient of extinction k of less than 0.02, the recording layer can have a lower absorptivity so that it might become difficult to record with a commonly used power. A coefficient of extinction k of more than 0.05 can result in a drop of reflectivity to below 70%, often failing to reproduce according to the CD standard.

The recording layer preferably has an index of refraction (the real part of a complex index of refraction) n of from 2.0 to 2.6 at the wavelength of recording and reproducing light. With $n<2.0$, the reflectivity and reproduced signal therewith would be reduced, often failing to reproduce according to the CD standard.

In the recording layer, the light absorbing dye may be used in admixture with a quencher. Alternatively or additionally, an ionically bonded combination of a dye cation and a quencher anion may also be used as a modified light absorbing dye.

The quenchers used herein include metal complexes of acetylacetonates, bisdithiols such as bis(dithio-α-diketones) and bisphenyldithiols, thiocatechols, salicylaldehydeoximes, and thiobisphenolates. Also useful are amine quenchers such as amine compounds having a nitrogenous radical cation and hindered amines.

In the case of the ionically bonded combination, cyanine dyes having an indolenine ring and metal complex quenchers such as bisphenyldithiol metal complexes are preferred.

With regard to the dyes, quenchers and their combinations, reference is made to the following patent applications, patents and publication.

| Japanese Patent Application Kokai (JP-A) Nos. | | |
|---|---|---|
| 24692/1984 | 55794/1984 | 55795/1984 |
| 81194/1984 | 83695/1984 | 18387/1985 |
| 19586/1985 | 19587/1985 | 35054/1985 |
| 36190/1985 | 36191/1985 | 44554/1985 |
| 44555/1985 | 44389/1985 | 44390/1985 |
| 47069/1985 | 20991/1985 | 71294/1985 |
| 54892/1985 | 71295/1985 | 71296/1985 |
| 73891/1985 | 73892/1985 | 73893/1985 |
| 83892/1985 | 85449/1985 | 92893/1985 |
| 159087/1985 | 162691/1985 | 203488/1985 |
| 201988/1985 | 234886/1985 | 234892/1985 |
| 16894/1986 | 11292/1986 | 11294/1986 |
| 16891/1986 | 08384/1986 | 14988/1986 |
| 163243/1986 | 210539/1986 | 30083/1987 |
| 32132/1987 | 31792/1987 | |
| Japanese Patent Application No. 54013/1985 | | |

Copending Serial Nos. 07/143,312 filed Jan. 6, 1988, and 07/544,013 filed Jun. 26, 1990, both by Namba; Abe, U.S. Pat. Nos. 4,600,625 and 4,652,514, and Sato, U.S. Pat. No. 4,626,496

"Chemistry of Functional Dyes", C.M.C. Publishing K. K., pages 74–76.

It should be understood that the quencher which may be added either separately from the light absorbing dye or in the bonded form should preferably be added in an amount of up to about 1 mol, especially about 0.05 to 0.5 mol per mol of the light absorbing dye or dyes because better light resistance is expectable.

The dye used in the recording layer may be selected from the above-mentioned light absorbing dyes, dye-quencher mixtures, and ionically bonded dye-quencher combinations as long as it has n and k in the above-defined ranges. If desired, a dye of a new design molecular structure may be synthesized. Additionally, the recording layer 3 may have n and k in the above-defined ranges if it is formed from a carefully chosen mixture of two or more compatible dyes. Such a dye mixture also helps improve wavelength dependency.

Referring to FIG. 2 again, the reflective layer 4 is deposited on the recording layer 3 in direct contact therewith. The reflective layer 4 may be formed of high reflectance metals such as Au and Cu and alloys thereof. The reflective layer 4 preferably has a thickness of at least about 500 Å. It can be formed by evaporation or sputtering. Although no upper limit is generally imposed on the thickness of the reflective layer, a thickness of up to about 1,200 Å is preferred for manufacturing cost and time. The reflective layer alone has a reflectivity of at least 90%, so that the reflectivity of an unrecorded portion of the disk through the substrate can be at least 60%, especially at least 70%.

As also shown in FIG. 2, the protective layer 5 may be formed on the reflective layer 4. The protective layer may be formed from any desired resin material such as a UV-curable resin, usually to a thickness of about 0.5 to about 100 $\mu$m. The protective layer may be either a layer or a sheet. The protective layer is prepared by conventional techniques including spin coating, gravure coating, spray coating, and dipping.

The optical recording disk of the present invention is not limited to the close contact type in the illustrated embodiment. The present invention is applicable to any optical recording disk as long as the recording layer is formed by applying a coating solution containing a dye. One of the other optical recording disks to which the present invention is applicable is a pit formation type optical recording disk of the air sandwich structure in which similar benefits are obtained by applying the present invention.

ADVANTAGES

The present invention allows the dye-containing recording layer to be accurately delimited on the predetermined region of the substrate without forming an inward extension. This improves the close contact of the overlying reflective and protective layers, offering a more aesthetic outer appearance. During rotation, the reflectivity of the mirror region 20 adjacent the inner peripheral edge can be read out with a minimal fluctuation.

EXAMPLE

To demonstrate these advantages, we performed a series of experiments, some of which are shown below.

EXAMPLES 1-3

A polycarbonate resin was injection molded into a substrate having a diameter of 120 mm and a thickness of 1.2 mm whereby spiral continuous grooves and spiral channels were concurrently formed. The channels having a depth of 1,600 Å, a width of 0.45 $\mu$m and a pitch of 1.6 $\mu$m were located within an inner annular band of 1 mm wide. The grooves were of the same dimensions, having a depth of 1,600 Å, a width of 0.45 $\mu$m and a pitch of 1.6 $\mu$m.

A coating solution containing a dye was spin coated on the grooved substrate. The coating solution was a diacetone alcohol solution containing 6% by weight of an indolenine cyanine dye and having a viscosity of about 5-6 centipoise. During spin coating, the substrate was rotated at 500 to 4,000 rpm. While injecting the coating solution through a nozzle, the nozzle was moved from a mid position radially spaced 40 mm from the center of the substrate to an inner position radially spaced 20 mm from the center of the substrate, that is, disposed near the channels, once stopped at the inner position, moved again to the mid position and further radially outward, and returned to the starting or mid position. The coating was then dried into a recording layer which had a thickness of 2,200 Å in the grooves.

This is designated sample No. 1.

Sample No. 2 was prepared by the same procedure as above except that a substrate without channels was used.

Sample Nos. 1 and 2 were visually observed around the inner periphery of the recording layer. In sample No. 1, the recording layer was clearly delimited without extending inward from the innermost channel. In sample No. 2, the inner periphery of the recording layer had corrugations of about ±1.5 mm (in a radial direction as seen in a plan view).

Next, an optical recording disk as shown in FIGS. 1 and 2 was fabricated from sample No. 1 by sputtering Au onto the recording layer to form a reflective layer of 1,500 Å thick, coating a UV-curable resin based on an oligoester acrylate thereon, and UV curing the resin to form a protective film of 5 $\mu$m thick. This is designated disk sample No. 1.

An optical recording disk designated disk sample No. 2 was similarly fabricated from sample No. 2 by successively forming the reflective layer and protective film on the recording layer.

Disk sample Nos. 1 and 2 were examined for the adhesion of the protective film by an adhesive tape test. No peeling occurred in disk sample No. 1. In disk sample No. 2, the protective film sections on the inward extending portion of the dye coat were peeled off, indicating poor adhesion.

Also the reflectivity of the recording layer was measured. Disk sample No. 1 showed a uniform reflectivity thoughout its recording layer. In disk sample No. 2, the inward extending portions or corrugations of the dye coat showed a variation of about 5% in reflectivity.

Sample No. 3 was prepared by the same procedure as Sample No. 1 except that a plurality of concentric channels were formed. Optical recording disk sample No. 3 was fabricated from Sample No. 3 by the same procedure as disk sample No. 1. Sample No. 3 and disk sample No. 3 were examined as above, obtaining equivalent results to those of Sample No. 1 and disk sample No. 1.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. In an optical recording disk comprising an annular substrate having an inner peripheral edge and an outer peripheral edge and a recording layer which is formed as a plurality of recording channels between the inner and outer peripheral edges by spin coating composition containing a dye to the rotating substrate, the improvement comprising at least one substantially curved channel formed in said substrate in proximity to and between the inner peripheral edge and the innermost of the recording channels for defining an inner boundary of the recording layer.

2. The disk of claim 1 which further comprises a reflective layer on the recording layer and a protective film thereon.

3. The disk of claim 1 wherein said substrate has a groove within a region where the recording layer is formed, the recording layer has a thickness of at least 2,000 Å in the groove, and said substrate includes a flat region disposed radially inward of said region and said at least one channel disposed radially inward of said flat region.

4. The disk of claim 1 wherein said at least one channel is a plurality of concentric circular channels.

5. The disk of claim 1 wherein said at least one channel is a spiral channel.

* * * * *